United States Patent

[11] 3,568,145

[72] Inventors Joseph K. Dikoff
15004 Oxnard St., Van Nuys, Calif. 91401;
J. Homer Harold Overholser, 4961
Palomar Drive, Tarzana, Calif. 91356
[21] Appl. No. 699,164
[22] Filed Jan. 19, 1968
[45] Patented Mar. 2, 1971

[54] TIRE-WARNING APPARATUS
5 Claims, 14 Drawing Figs.
[52] U.S. Cl. .................................................... 340/58,
200/61.23, 73/146.5
[51] Int. Cl. ..................................................... B60c 23/00
[50] Field of Search .......................................... 340/52, 58;
200/61.22, 61.23, 61.25, 61.26, 61.4; 116/34;
73/146, 146.2, 146.5

[56] References Cited
UNITED STATES PATENTS
2,215,153  9/1940  Hull ........................... 200/61.26
3,222,641  12/1965  Jacobus ....................... 200/61.25X Primary Examiner—Alvin H. Waring
Attorney—Fulwider, Patton, Rieber, Lee & Utecht ABSTRACT: A tire-warning apparatus including a sensor disposed in a tire and connected in electrical circuit with a power source and an indicator. The sensor includes an elongated conductor having one end in connection with the power source and the opposite end, in one embodiment, adapted for contact with the tire rim when the tire becomes partially deflated to complete the electrical circuit through the indicator and indicate the condition of the tire. In another embodiment the opposite end of the conductor is an electrical contact with the rim and its intermediate portion is disposed a predetermined distance beneath the peripheral surface of the tire whereby it will be worn through to break the electrical circuit when the tire becomes worn.

PATENTED MAR 2 1971 3,568,145
SHEET 1 OF 3
FIG.1
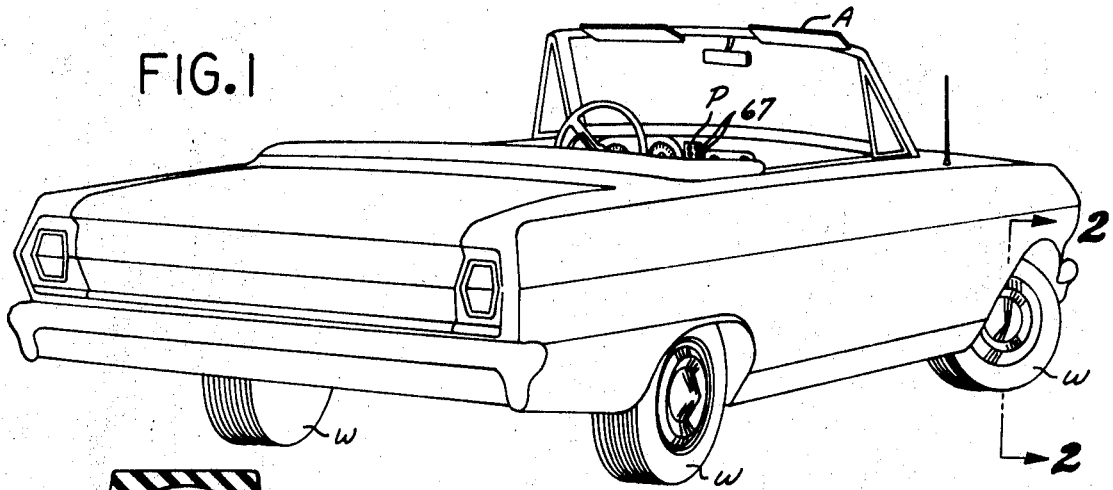
FIG.2
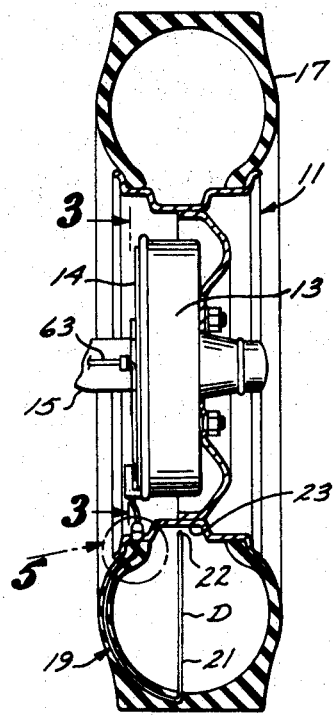
FIG.3
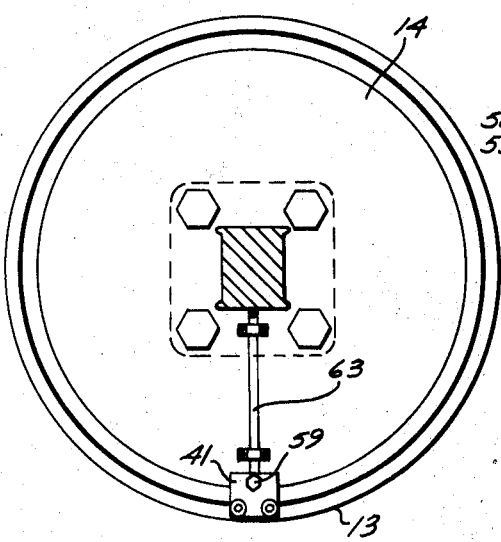
FIG.4
FIG.5
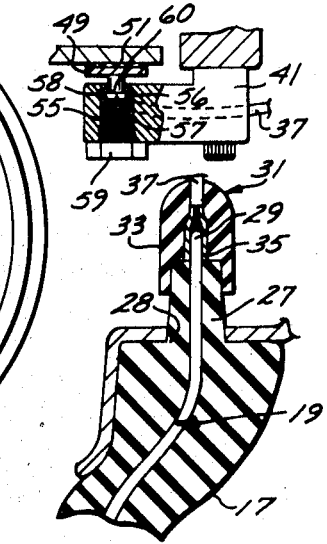
FIG.6
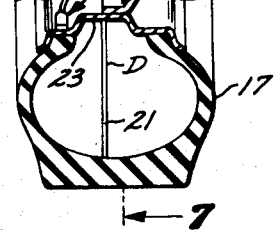
FIG.7
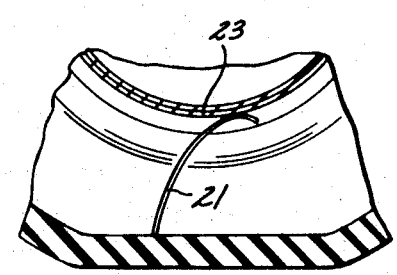
INVENTORS
JOSEPH K. DIKOFF
J. HOMER HAROLD OVERHOLSER
BY
Fulwider, Patton, Rieber,
Lee and Utecht
ATTORNEYS

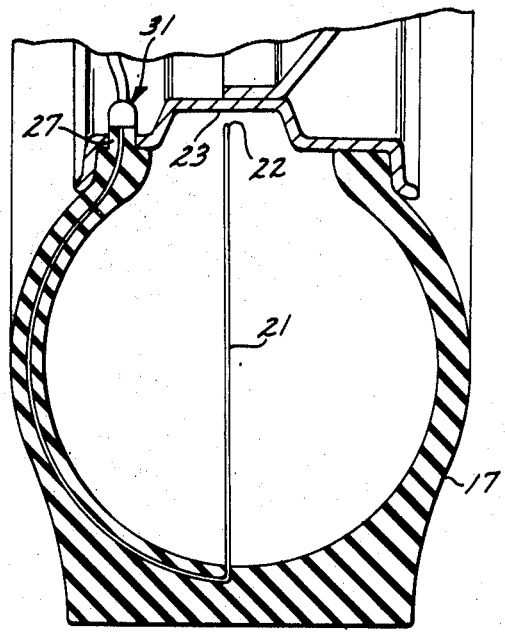
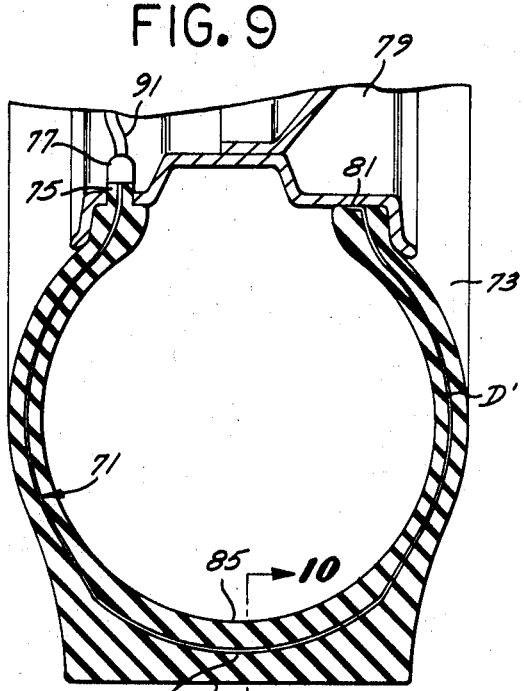
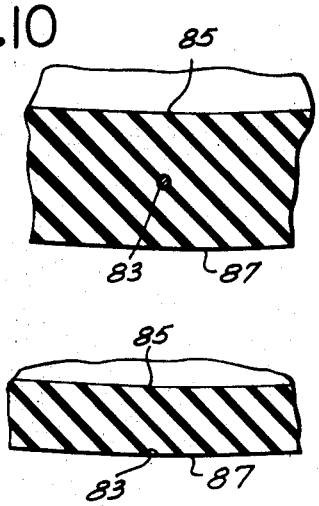
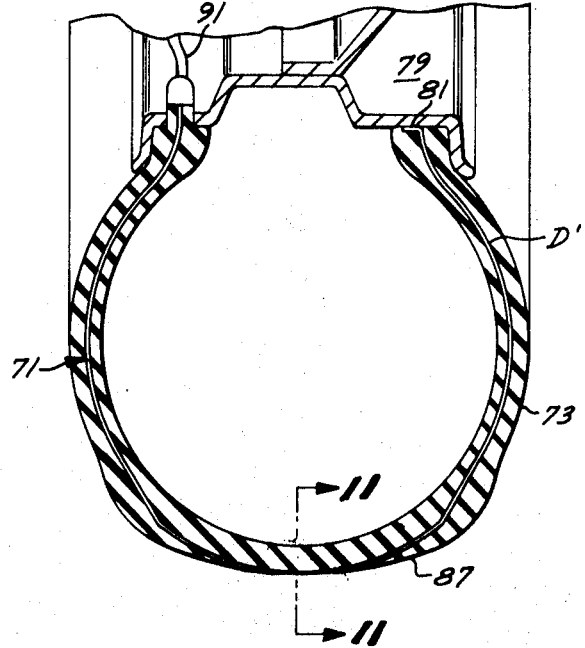

TIRE-WARNING APPARATUS

BACKGROUND OF THE INVENTION

1. Field of the Invention

The present invention relates to an electrical apparatus for indicating the condition of a pneumatic tire.

2. Description of the Prior Art

There are no tire warning devices known to applicant which utilize an electrical conductor which is grounded with or ungrounded from the rim of the tire to indicate a particular condition of the tire.

SUMMARY OF THE INVENTION

The present invention is characterized by an electrical conductor disposed in the tire and having one end adapted for engagement with the tire rim to provide a ground and indicate the condition of the tire.

DESCRIPTION OF THE DRAWINGS

FIG. 1 is a perspective view of an automobile having a tire-warning apparatus embodying the present invention installed thereon;

FIG. 2 is a vertical sectional view, in enlarged scale, taken along the lines 2-2 of FIG. 1;

FIG. 3 is a vertical sectional view, in enlarged scale, taken along the lines 3-3 of FIG. 2;

FIG. 4 is a vertical sectional view, in enlarged scale, taken along the lines 4-4 of FIG. 3;

FIG. 5 is a partial vertical sectional view, in enlarged scale, taken from the circle designated 5 in FIG. 2;

FIG. 6 is a partial vertical sectional view similar to FIG. 2;

FIG. 7 is a vertical sectional view taken along the lines 7-7 of FIG. 6;

FIG. 8 is a partial vertical sectional view, in enlarged scale, similar to FIG. 6;

FIG. 9 is a vertical sectional view similar to FIG. 8 and showing a second embodiment of the present invention;

FIG. 10 is a vertical sectional view, in enlarged scale, taken along the lines 11-11 of FIG. 9.

FIG. 11 is a vertical sectional view similar to FIG. 10;

FIG. 12 is a vertical sectional view similar to FIG. 9;

DESCRIPTION OF PREFERRED EMBODIMENTS

Figure 13:
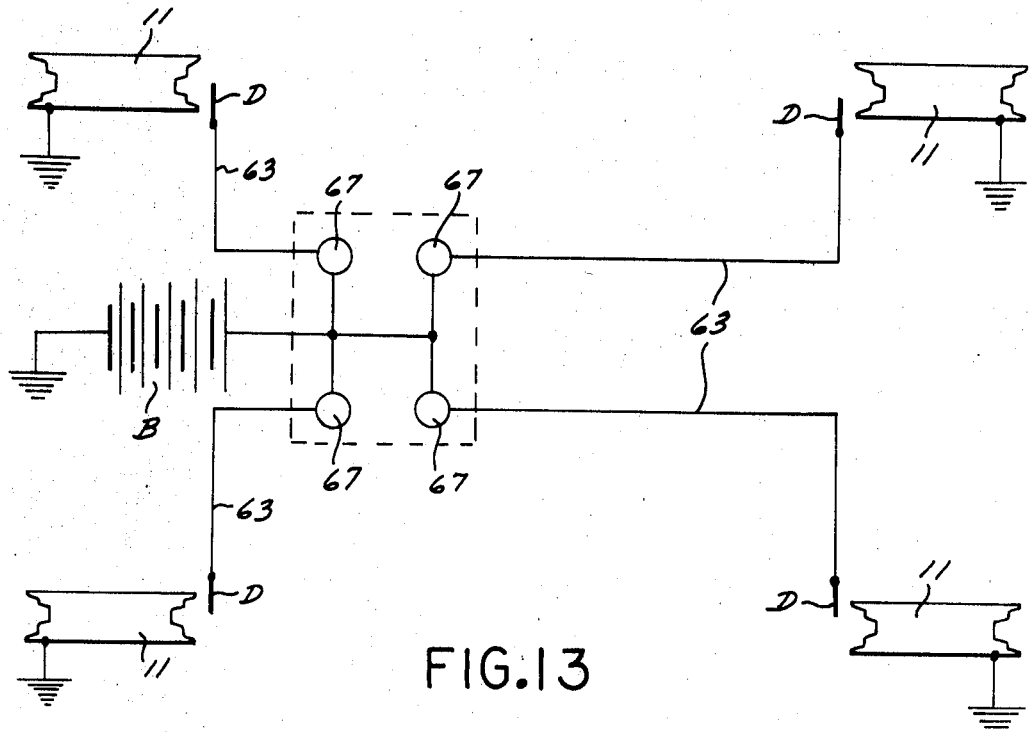
FIG. 13 is a schematic diagram of an electrical circuit that may be utilized with the tire warning shown in FIG. 1.

The automobile A shown in FIG. 1 includes a tire-warning device D (FIG. 1) embodying the present invention. The automobile wheel W includes a rim, generally designated 11, which is bolted to a conventional brake drum 13 that is rotatable with respect to the plate 14 affixed to the axle 15. The rim 11 mounts a pneumatic tire 17 which has an electrically conductive wire, generally designated 19, embedded in the wall thereof. The wire 19 is shaped to have the embedded portion follow the general contour of the tire wall and the remainder project radially inwardly from the outer periphery of the tire to form a flexible electrically conductive probe 21. The probe 21 is of sufficient length to have its free end 22 normally separated from the central portion 23 of the rim 11.

Referring to FIG. 5, the vertical wall of the tire 17 is formed at its radially inner edge with a radially inwardly projecting nipple 27, shaped similar to an ordinary valve stem. The stem 27 projects radially inwardly through a bore 28 in the rim 11 and includes a central bore through which the wire 19 extends and such wire projects beyond the end of the stem 27 to form a male electrical contact 29.

A female electrical connector, generally designated 31, includes a hollow housing 33 made of resilient electrically insulating material, and an electrically conductive cylindrically shaped receptacle 35. The receptacle 35 is affixed to the end of an electrical lead 37 which leads to a brush housing 41 (FIG. 4) disposed in radial alignment with the probe 21. The brush housing 41 is affixed to the axially inner edge of the wall of the brake drum 13 and projects radially inwardly over the nonrotating plate 14. The plate 14 has an electrically conductive brush 49 mounted on its inner surface near its periphery and such brush is insulated from the plate by a complementary shaped insulator 51 (FIG. 4). If desired the brush 49 could be in the form of a ring extending around the marginal edge of the plate 14.

The radially inner end of the brush housing 41 projects over the plate 14 and includes a brush cavity 55 confronting the brush 49 and formed with a shoulder 56. A brush 57 is inserted in the cavity 55 and is pressed against the brush 49 by a compression spring 58 (FIG. 4) held in the cavity 55 by a stud 59 screwed thereinto. The brush 57 includes a shoulder 60 for abutting the shoulder 56 to limit the distance the spring 58 can push the brush 57 whereby the brush contacts the plate brush 49 each time the rim completes a revolution but is prevented from being brought into contact with the plate 14 when the brush 49 is not disposed thereunder. The lead 37, connected with the female connector 31, extends through the housing 41 and connects with the brush 57.

Referring to FIGS. 2 and 3, an insulated electrical wire 63 is connected with the brush 49 and extends inwardly along the plate 14 and turns in along the axle 15 from where it leads forwardly in the automobile A and is connected with a signal panel P (FIG. 1) mounted on the dashboard of the automobile.

Referring to FIG. 13, wherein a schematic of an electrical circuit that may be utilized in the device D is shown, the panel P includes four signal lights 67. The lights 67 are connected in parallel with each other and have their positive sides connected with the automobile battery B. The negative sides of the respective signal lights 67 are connected with the respective tire warning devices D of the respective four wheels of the automobile A.

From the above description, it will be clear that when any one of the tires 17 loses pressure and tends to squat, as shown in FIG. 6, the radially inner tip 22 of the respective probe 21 will contact the central portion 23 of the rim 11 each time the wheel W rotates and provide an intermittent ground for the respective lights 67. Obviously, the probe 21 can be provided at any desired length to signal a pressure loss at any predetermined pressure setting.

Figure 14:
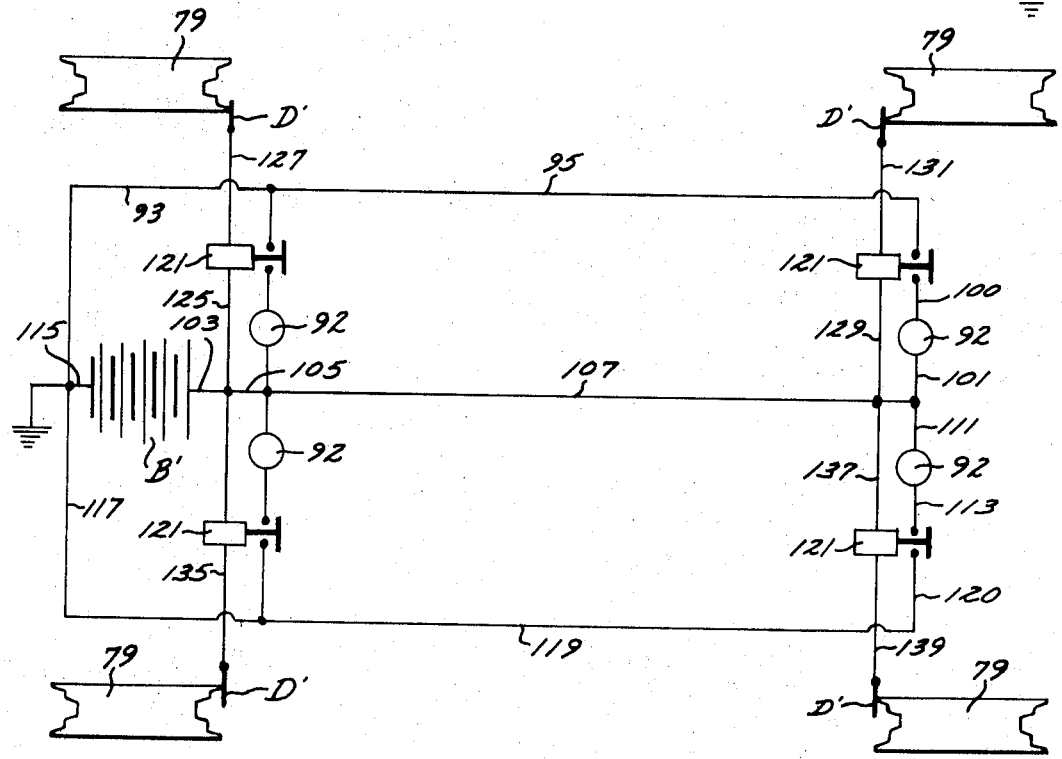
FIG. 14 is a schematic diagram of an electrical circuit that may be utilized with the tire warning apparatus shown in FIG. 9.

A second embodiment of the warning device D' of the present invention is shown in FIGS. 10, 11, 12, 9, and 14, and includes an electrically conductive wire, generally designated 71, which is embedded in the wall of a tire 73. The tire 73 includes a nipple 75, similar to nipple 27, and the wire 71 projects thereabove to connect with a female connector 77. The wire 71 extends radially around the wall of the tire 73 from the nipple 75 and contacts the mounting rim 79 at its bent over extremity 81. The intermediate portion 83 of the wire 71 is embedded a distance below the inner surface 85 of the tire 73 sufficient to assure that when the wearing surface 87 is worn down thereto, the tire 73 still has sufficient strength to assure the safety of the tire. FIG. 14 shows a schematic of an electrical circuit that can be utilized with the warning device D. The leads 91 from the respective female connector 77 are preferably connected to a brush (not shown) similar to the brush 49, but which is in the form of an annular ring extending around the periphery of the plate 14 to maintain constant contact with the brush 57.

Referring to FIG. 14, respective indicator lights 92 are disposed on the automobile dash and are connected in parallel with the automobile ignition system by leads 93, 95, 97, 99, 100, 101, 103, 105, 107, 109, 111, 113, 115, 117, 119 and 120. Normally open relays 121 have their coils connected in parallel with the positive side of the automobile ignition system and the respective warning devices D' by leads 125, 127, 129, 131, 135, 137 and 139. Thus, whenever the peripheral wearing surface 87 of one of the tires 73 is worn down and the intermediate portion 83 of the conductor 71 worn through the coil of the associated relay 121 will become ungrounded and the relay will close energizing the associated indicator light 92 thus notifying the driver that the tire is dangerously worn.

From the foregoing, it will be clear that the tire safety device of this invention is convenient and economical to manufacture and easy to install. Accordingly, a convenient and economical means is provided for detecting deflation of a tire before it becomes dangerously low, as well as for detecting excessive tire wear. The advantage of deflation detection is of special importance in a truck having dual tires because the driver has no way of knowing when one tire of a dual pair has become deflated. With a device of this invention, the probe 21 can be made of sufficient length to cause the extending end 22 to contact the rim portion 23 whenever the total weight normally carried by a pair of duals is transferred to only one tire of the pair thereby causing such weight-carrying tire to squat and lighting the associated light 67.

Various modifications and changes may be made with regard to the foregoing detailed description without departing from the spirit of the invention or the scope of the following claims.

I claim:

1. Tire-warning apparatus for indicating tire deflation and comprising:
    a deflation indicator;
    a tubeless tire for being mounted on a rim and including an elongated electrical sensor carried on one end from the peripheral wall of said tire and formed with a free end spaced a selected distance from said rim when said tire is inflated to its normal pressure, said tire being sufficiently flexible to squat sufficiently under the weight normally carried thereby when said tire reaches a predetermined level of deflation to engage said free end with said rim; and
    circuit means for connecting said deflation indicator in circuit with said sensor and a power source whereby said free end of said sensor will be spaced from said rim when said tire is fully inflated and when said tire reaches said predetermined level of deflation the tire will squat to cause said free end to engage said rim and complete a circuit through said indicator.

2. Tire-warning apparatus as set forth in claim 1 wherein said sensor includes a mounting portion embedded in the sidewall of said tire.

3. Tire-warning apparatus as set forth in claim 2 wherein:
    said tire is formed with a connector nipple; and
    said sensor is formed with an electrical contact projecting from said nipple for connection with a mating electrical contact.

4. Tire-warning apparatus as set forth in claim 1 wherein said tire is made of electrically insulating material and said sensor is carried therefrom to normally insulate said sensor from said rim.

5. Tire-warning apparatus as set forth in claim 1 wherein said tire is mounted on a wheel of the type that includes a nonrotary plate supported from the axle and a rotary brake drum, said apparatus including:
    a first electrical brush mounted on said plate; and
    brush means mounted on said brake drum including a second brush biased to engage said first brush.